US008233368B2

(12) United States Patent
Ross et al.

(10) Patent No.: US 8,233,368 B2
(45) Date of Patent: Jul. 31, 2012

(54) METHOD AND SYSTEM FOR BIT PREDICTION USING A MULTI-PIXEL DETECTOR

(75) Inventors: John Anderson Fergus Ross, Niskayuna, NY (US); Kenneth Brakeley Welles, Scotia, NY (US); John Erik Hershey, Ballston Lake, NY (US); Xiaolei Shi, Niskayuna, NY (US); Victor Petrovich Ostroverkhov, Ballston Lake, NY (US)

(73) Assignee: General Electric Copany, Schenectady, NY (US)

( * ) Notice: Subject to any disclaimer, the term of this patent is extended or adjusted under 35 U.S.C. 154(b) by 683 days.

(21) Appl. No.: 12/338,828

(22) Filed: Dec. 18, 2008

(65) Prior Publication Data

US 2010/0157771 A1     Jun. 24, 2010

(51) Int. Cl.
    *G11B 7/00* (2006.01)
(52) U.S. Cl. ............... 369/103; 369/47.35; 369/124.05; 369/53.35
(58) Field of Classification Search .......... 369/103, 369/112.01, 112.23, 53.35, 47.35, 59.21, 369/124.05
See application file for complete search history.

(56) References Cited

U.S. PATENT DOCUMENTS

| 5,450,218 | A  | * | 9/1995  | Heanue et al. ............... 359/21 |
| 5,510,912 | A  |   | 4/1996  | Blaum et al. |
| 5,727,226 | A  |   | 3/1998  | Blaum et al. |
| 5,808,998 | A  |   | 9/1998  | Curtis et al. |
| 6,175,317 | B1 |   | 1/2001  | Ordentlich et al. |
| 6,549,664 | B1 |   | 4/2003  | Daiber et al. |
| 6,563,779 | B1 |   | 5/2003  | McDonald et al. |
| 6,614,741 | B1 | * | 9/2003  | Hesselink et al. ............ 369/103 |
| 6,711,711 | B2 | * | 3/2004  | Hwang ......................... 714/792 |
| 6,738,322 | B2 | * | 5/2004  | Amble et al. .............. 369/44.27 |
| 6,889,907 | B2 |   | 5/2005  | Roh |
| 6,950,382 | B2 | * | 9/2005  | Akselrod et al. ............. 369/103 |
| 7,020,054 | B2 |   | 3/2006  | Kadlec et al. |
| 7,324,249 | B2 | * | 1/2008  | Uchida et al. ................... 359/22 |
| 7,388,695 | B2 |   | 6/2008  | Lawrence et al. |
| 7,898,924 | B2 | * | 3/2011  | Bates et al. ................... 369/103 |
| 2002/0172131 | A1 | * | 11/2002 | Burr .............................. 369/103 |
| 2005/0136333 | A1 |   | 6/2005  | Lawrence et al. |

(Continued)

OTHER PUBLICATIONS

Freeman, Mark O. et al., Robust Focus and Tracking Detection for Holographic Digital Versatile Disc Optical Pickup-Head Modules, Jpn. J. Appl. Phys. vol. 38 (1999), pp. 1755-1760, Part 1, No. 3B, Mar. 1999.

(Continued)

*Primary Examiner* — Thomas Alunkal
(74) *Attorney, Agent, or Firm* — Fletcher Yoder (57) ABSTRACT

The present techniques provide methods and systems for more reliable reading of optical data disks. In embodiments, a multi-pixel detector that is segmented into multiple areas, or detector segments, may be used to detect a pattern in the light reflected from an optical data disk. The pattern may include light scattered from a single bit that may be under a center detector, as well as light scattered from proximate bits. The detector system may then combine the quantized values from each of the detector segments mathematically to determine the presence or absence of a bit or bits of data. The mathematical combination may also use data that is known about the status of adjacent data bits (such as previously read bits, or bit patterns which are allowed or not allowed by specific data encoding schemes) to improve the accuracy of the bit prediction.

16 Claims, 9 Drawing Sheets

U.S. PATENT DOCUMENTS

| | | | |
|---|---|---|---|
| 2005/0286388 A1* | 12/2005 | Ayres et al. | 369/103 |
| 2006/0073392 A1 | 4/2006 | Erben et al. | |
| 2006/0078802 A1 | 4/2006 | Chan et al. | |
| 2007/0097469 A1 | 5/2007 | Erben et al. | |
| 2007/0146835 A1 | 6/2007 | Erben et al. | |
| 2008/0055686 A1 | 3/2008 | Erben et al. | |
| 2008/0144145 A1 | 6/2008 | Boden et al. | |
| 2008/0144146 A1 | 6/2008 | Boden et al. | |

OTHER PUBLICATIONS

Steinbuch, Maarten et al., Limits of Implementation: A CD Player Control Case Study, Proceedings of the American Control Conference, Baltimore, Maryland, Jun. 1994, pp. 3209-3213, Article No. FP2—5:00.

U.S. Appl. No. 12/338,841, filed Dec. 18, 2008, John Anderson Fergus Ross et al.

U.S. Appl. No. 12/342,794, filed Dec. 23, 2008, John Anderson Fergus Ross et al.

U.S. Appl. No. 12/343,204, filed Dec. 23, 2008, Ruediger Kusch.

U.S. Appl. No. 12/346,279, filed Dec. 30, 2008, Victor Ostroverkhov et al.

U.S. Appl. No. 12/346,378, filed Dec. 30, 2008, Xiaolei Shi et al.

U.S. Appl. No. 12/347,178, filed Dec. 31, 2008, Victor Ostroverkhov et al.

U.S. Appl. No. 12/347,211, filed Dec. 31, 2008, Xiaolei Shi et al.

U.S. Appl. No. 12/336,399, filed Dec. 16, 2008, John Erik Hershey et al.

U.S. Appl. No. 12/336,414, filed Dec. 16, 2008, John Anderson Fergus Ross et al.

U.S. Appl. No. 12/336,457, filed Dec. 17, 2008, John Anderson Fergus Ross et al.

* cited by examiner

METHOD AND SYSTEM FOR BIT PREDICTION USING A MULTI-PIXEL DETECTOR

BACKGROUND

The present techniques relate generally to optical storage techniques. More specifically, the techniques relate to high bit density in bit-wise holographic storage systems.

As computing power has advanced, computing technology has entered new application areas, such as consumer video, data archiving, document storage, imaging, and movie production, among others. These applications have provided a continuing push to develop data storage techniques that have increased storage capacity. Further, increases in storage capacity have both enabled and promoted the development of technologies that have gone far beyond the initial expectations of the developers, such as gaming, among others.

The progressively higher storage capacities for optical storage systems provide a good example of the developments in data storage technologies. The compact disk, or CD, format, developed in the early 1980s, has a capacity of around 650-700 MB of data, or around 74-80 min. of a two channel audio program. In comparison, the digital versatile disc (DVD) format, developed in the early 1990s, has a capacity of around 4.7 GB (single layer) or 8.5 GB (dual layer). The higher storage capacity of the DVD is sufficient to store full-length feature films at older video resolutions (for example, PAL at about 720 (h)×576 (v) pixels, or NTSC at about 720 (h)×480 (v) pixels).

However, as higher resolution video formats, such as high-definition television (HDTV) (at about 1920 (h)×1080 (v) pixels for 1080p), have become popular, storage formats capable of holding full-length feature films recorded at these resolutions have become desirable. This has prompted the development of high-capacity recording formats, such as the Blu-ray Disc™ format, which is capable of holding about 25 GB in a single-layer disk, or 50 GB in a dual-layer disk. As resolution of video displays, and other technologies, continue to develop, storage media with ever-higher capacities will become more important. One developing storage technology that may better achieve future capacity requirements in the storage industry is based on holographic storage.

Holographic storage is the storage of data in the form of holograms, which are images of three dimensional interference patterns created by the intersection of two beams of light in a photosensitive storage medium. Both page-based holographic techniques and bit-wise holographic techniques have been pursued. In page-based holographic data storage, a signal beam which contains digitally encoded data, typically a plurality of bits, is superposed on a reference beam within the volume of the storage medium resulting in a chemical reaction which, for example, changes or modulates the refractive index of the medium within the volume. This modulation serves to record both the intensity and phase information from the signal. Each bit is therefore generally stored as a part of the interference pattern. The hologram can later be retrieved by exposing the storage medium to the reference beam alone, which interacts with the stored holographic data to generate a reconstructed signal beam proportional to the initial signal beam used to store the holographic image.

In bit-wise holography or micro-holographic data storage, every bit is written as a micro-hologram, or Bragg reflection grating, typically generated by two counter-propagating focused recording beams. The data is then retrieved by using a read beam to reflect off the micro-hologram to reconstruct the recording beam. Accordingly, micro-holographic data storage is more similar to current technologies than page-wise holographic storage. However, in contrast to the two layers of data storage that may be used in DVD and Blu-ray Disk™ formats, holographic disks may have 50 or 100 layers of data storage, providing data storage capacities that may be measured in terabytes (TB). Further, as for page-based holographic data storage, each micro-hologram contains phase information from the signal.

Although holographic storage systems may provide much higher storage capacities than prior optical systems, as is the case for all optical storage media, they may be vulnerable to interferences between the closely spaced bits in adjacent tracks and layers. More specifically, the close spacing of adjacent bits makes schemes that allow more accurate reading of these closely spaced bits advantageous.

BRIEF DESCRIPTION

An embodiment of the present techniques provides a method for reading data from an optical data disk. The method includes emitting a read beam toward an optical data disk, wherein the read beam is configured to substantially simultaneously illuminate a plurality of micro-reflectors on the optical data disk. Light reflected from the plurality of micro-reflectors is detected by a multi-pixel detector, and a pattern detected by the multi-pixel detector is analyzed to predict a state of a bit. A bit state of "0" may represent that no micro-reflector is present, and a bit state of "1" may represent that a micro-reflector is present.

Another embodiment provides a detector for reading optical disks including an emitter configured to emit a collimated beam, and optical elements configured to focus the collimated beam onto an area of a data disk and collect light reflected from the area of the data disk. The area impinges upon at least two adjacent bit positions. The detector includes a multi-pixel detector configured to detect a pattern from the light reflected from the data disk, and a bit predictor configured to analyze the pattern and predict a state of a bit on the data disk.

Another embodiment provides a method for predicting the state of a bit read from an optical disk. The method includes detecting a pattern of reflected light from an optical disk using a multi-pixel detector; comparing the pattern to a series of stored patterns in a bit predictor to identify a corresponding pattern, and predicting the state of a bit by the corresponding pattern.

Still another embodiment provides a system for reading a data disk that includes a multi-pixel detector configured to read a sequence of patterns from an optical disk, a bit predictor configured to analyze each of the patterns in the sequence and predict a value for a bit from the pattern to form a sequence of bits, and a processor configured to analyze the sequence of bits and generate a digital data signal.

Yet another embodiment provides a system for reading a data disk that includes a multi-pixel detector configured to read a sequence of patterns from an optical disk, an analog-to-digital converter configured to convert the sequence of patterns to a digital signal, and a bit predictor configured to analyze the digital signal and predict a value for a bit to form a bit signal.

A further embodiment provides an optical storage disk that includes a recording surface, wherein the recording surface comprises a photosensitive media containing a plurality of micro-holograms disposed in data tracks. Each of the plurality of data tracks is disposed at about one beam width separation from adjacent data tracks.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for one of ordinary skill having the benefit of this disclosure.

Bit-wise holographic data storage systems typically use a focused laser as a read beam to read data bits, represented by the presence or absence of micro-holograms on a data disk. Each of the micro-holograms acts as a Bragg reflector, which uses an interference pattern to reflect a narrow frequency band of light by constructive and destructive interference. The Bragg reflector may also carry phase information in the interference pattern. The read beam will not generally be focused on a point on the disk, but will cover a finite area, generally in the shape of a circular disk. The finite focal area may limit the minimum separation between adjacent micro-holograms, such as in adjacent tracks, which may be used while still maintaining adequate read accuracy of the individual bits. For example, in accordance with conventional systems, the finite focal area of the beam may limit a separation between adjacent tracks to about 1.5 times the width of the focused beam. The same considerations, e.g., the focal area of the read beam, may impose similar limitations on optical disks that use pits and lands for data storage, including DVDs, Blu-Ray™ disks, and the like.

The present techniques provide methods and systems for more reliable reading of optical data disks. In the present techniques, a multi-pixel detector, or a detector with multiple pixels, may be used to detect a pattern in the light reflected from an optical data disk. The pattern may include light scattered from a single bit that may be under the center of the detector, and may also include light scattered from proximate bits. A bit may represent a micro-hologram, and as will be further discussed, the energies of the light scattered by multiple bits or micro-holograms may be proportional to a pixel output from the detector. The detector system may combine the quantized values of bits from each of the detector pixels mathematically to predict the state of a bit or bits of data under the detector. The mathematical combination may also use data that is known about the status of adjacent data bits (such as previously read bits or bit patterns which are allowed or not allowed by specific data encoding schemes). Using this other data may increase the accuracy of reading the bit or bits in question.

For example, in one embodiment the pattern received at the multi-pixel detector may be compared to a series of stored patterns to predict the state of a bit or bits of data under the multi-pixel detector. The multi-pixel detector may also be used to predict multiple bits in parallel, and thus increase the reading speed of the optical disk. Further, the quantized values from pixels of the detector may be converted to ones or zeros, corresponding to the state of bits representing a pixel. This binary conversion may be based on a threshold value, prior to the analysis by a bit predictor. For example, a pixel that has registered more than 60% of the maximum value for light intensity may be converted into a binary one, while a pixel that has registered a lower light intensity than 60% may be converted into a binary zero. Other threshold values may be used, depending on the sensitivity desired.

If the data is stored volumetrically by individual micro-holograms (which act as Bragg reflectors), then the pattern generated at the detector may have special characteristics due to constructive and destructive interference of the light reflected by the bit or bits being read and multiple adjacent bits which are also illuminated. Accordingly, the interference pattern as it appears on the detector may be useful in determining the state of a bit or bits of data. For example, data that is stored by small relative phase changes between adjacent Bragg reflectors may create distinguishable interference patterns at the detector. Segmentation of the detector based on bit location format and phase modulation format may allow data bits in the optical data storage medium to be more densely packed and more accurately read.

Figure 1:
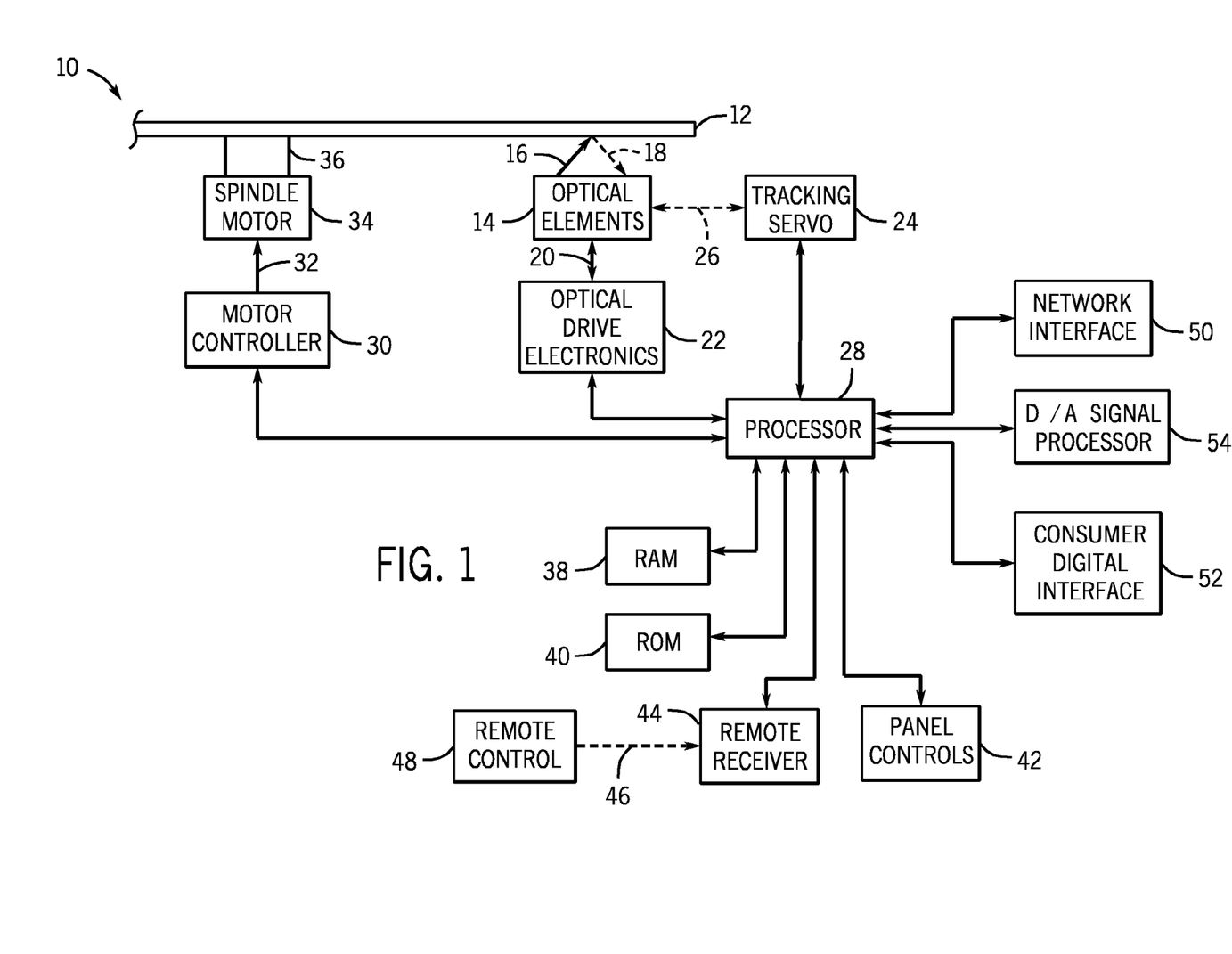
FIG. 1 is a block diagram of an optical disk reader, in accordance with an embodiment of the present techniques.

Turning now to the figures, FIG. 1 is an optical reader system 10 that may be used to read data from optical storage discs 12. The data stored on the optical data disc 12 is read by a series of optical elements 14, which project a read beam 16 onto the optical data disc 12. A reflected beam 18 is picked up from the optical data disc 12 by the optical elements 14. The optical elements 14 may comprise any number of different elements designed to generate excitation beams, focus those beams on the optical data disc 12, and detect the reflection 18 coming back from the optical data disc 12. The optical elements 14 are controlled through a coupling 20 to an optical drive electronics package 22. The optical drive electronics package 22 may include such units as power supplies for one or more laser systems, detection electronics to detect an electronic signal from the detector, analog-to-digital converters to convert the detected signal into a digital signal, and other units such as a bit predictor to predict when the detector signal is actually registering a bit value stored on the optical data disc 12.

The location of the optical elements 14 over the optical data disc 12 is controlled by a tracking servo 24 which has a mechanical actuator 26 configured to move the optical elements back and forth over the surface of the optical data disc 12. The optical drive electronics 22 and the tracking servo 24 are controlled by a processor 28. The processor 28 also controls a motor controller 30 which provides the power 32 to a spindle motor 34. The spindle motor 34 is coupled to a spindle 36 that controls the rotational speed of the optical data disc 12. As the optical elements 14 are moved from the outside edge of the optical data disc 12 closer to the spindle 36, the rotational speed of the optical data disc may be increased by the processor 28. This may be performed to keep the data rate of the data from the optical data disc 12 essentially the same when the optical elements 14 are at the outer edge as when the optical elements are at the inner edge. The maximum rotational speed of the disk may be about 500 revolutions per minute (rpm), 1000 rpm, 1500 rpm, 3000 rpm, 5000 rpm, 10,000 rpm, or higher.

The processor 28 is connected to random access memory or RAM 38 and read only memory or ROM 40. The ROM 40 contains the programs that allow the processor 28 to control the tracking servo 24, optical drive electronics 22, and motor controller 30. Further, the ROM 40 also contains programs that allow the processor 28 to analyze data from the optical drive electronics 22, which has been stored in the RAM 38, among others. As discussed in further detail herein, such analysis of the data stored in the RAM 38 may include, for example, demodulation, decoding or other functions necessary to convert the information from the optical data disc 12 into a data stream that may be used by other units.

If the optical reader system 10 is a commercial unit, such as a consumer electronic device, it may have controls to allow the processor 28 to be accessed and controlled by a user. Such controls may take the form of panel controls 42, such as keyboards, program selection switches and the like. Further, control of the processor 28 may be performed by a remote receiver 44. The remote receiver 44 may be configured to receive a control signal 46 from a remote control 48. The control signal 46 may take the form of an infrared beam, or a radio signal, among others.

After the processor 28 has analyzed the data stored in the RAM 38 to generate a data stream, the data stream may be provided by the processor 28 to other units. For example, the data may be provided as a digital data stream through a network interface 50 to external digital units, such as computers or other devices located on an external network. Alternatively, the processor 28 may provide the digital data stream to a consumer electronics digital interface 52, such as a high-definition multi-media interface (HDMI), or other high-speed interfaces, such as a USB port, among others. The processor 28 may also have other connected interface units such as a digital-to-analog signal processor 54. The digital-to-analog signal processor 54 may allow the processor 28 to provide an analog signal for output to other types of devices, such as to an analog input signal on a television or to an audio signal input to an amplification system.

Figure 2:
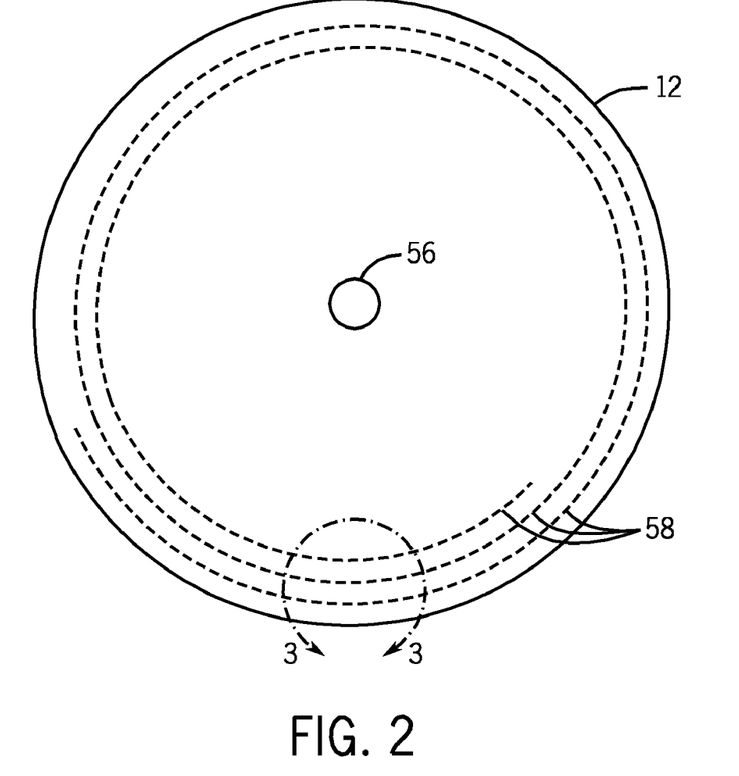
FIG. 2 illustrates an optical disk having data tracks, in accordance with an embodiment.

The reader 10 may be used to read an optical data disk 12 containing data as shown in FIG. 2. Generally, the optical data disk 12 is a flat, round disk with one or more data storage layers embedded in a transparent plastic coating. The data layers may include any number of surfaces that may reflect light, such as the micro-holograms used for a bit-wise holographic data storage or a reflective surface with pits and lands. A spindle hole 56 couples to the spindle 36 to control the rotation speed of the disk 12. The data may be generally written in a sequential spiraling track 58 from the outer edge of the disk 12 to an inner limit, although circular tracks, or other configurations, may be used.

Figure 3:
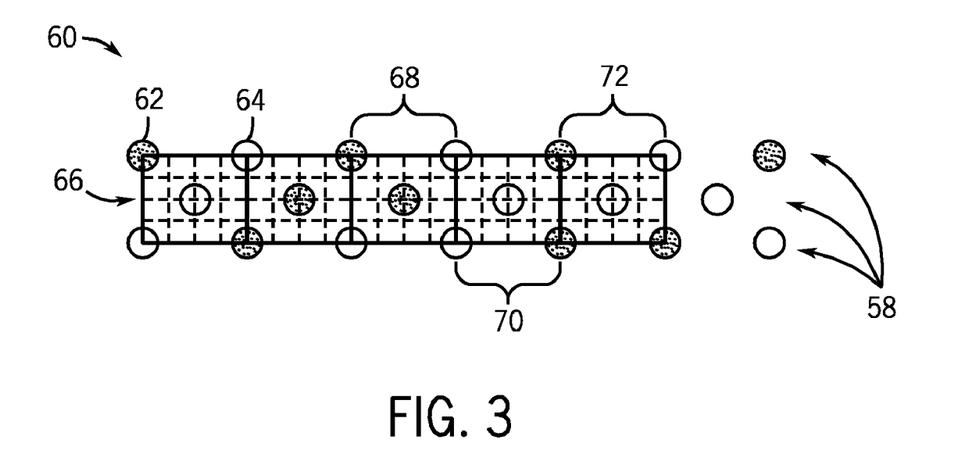
FIG. 3 is a close-up view of the data tracks of an optical data disk, in accordance with an embodiment.

A closer view 60 of three adjacent data tracks 58 is illustrated in FIG. 3. As shown in FIG. 3, each data track may have micro-holograms 62 which may represent a bit-state of one. The absence of a micro-hologram, as indicated by the blank space 64 may be used to indicate a bit-state of zero. In contemplated embodiments, a multi-pixel detector 66 may be divided into separate detector segments, indicated by the solid outlines, which may be used to substantially simultaneously read multiple bits. For example, a central target bit may be read by a center detector segment 68. The multi-pixel detector segments may also include a first segment 70 ahead of the center detector segment 68 and a second segment 72 ahead of the center detector segment 68 to detect bits before the center detector segment 68. The detector may also have trailing segments to read bits after the center detector segment 68. Generally the number of pixels in the multi-pixel detector 66 does not have to match the number of detector segments. In some embodiments, the multi-pixel detector 66 shown above may have 16, 256, 512, 1024 or any other number of pixels. For example, the dotted-line grid illustrated in FIG. 3 may represent a pixel array, and each of the detector segments 68, 70, and 72 have a 4×4 pixel array. As will be discussed, the number of pixels in the multi-pixel detector may affect the read accuracy of the detector.

Figure 4:
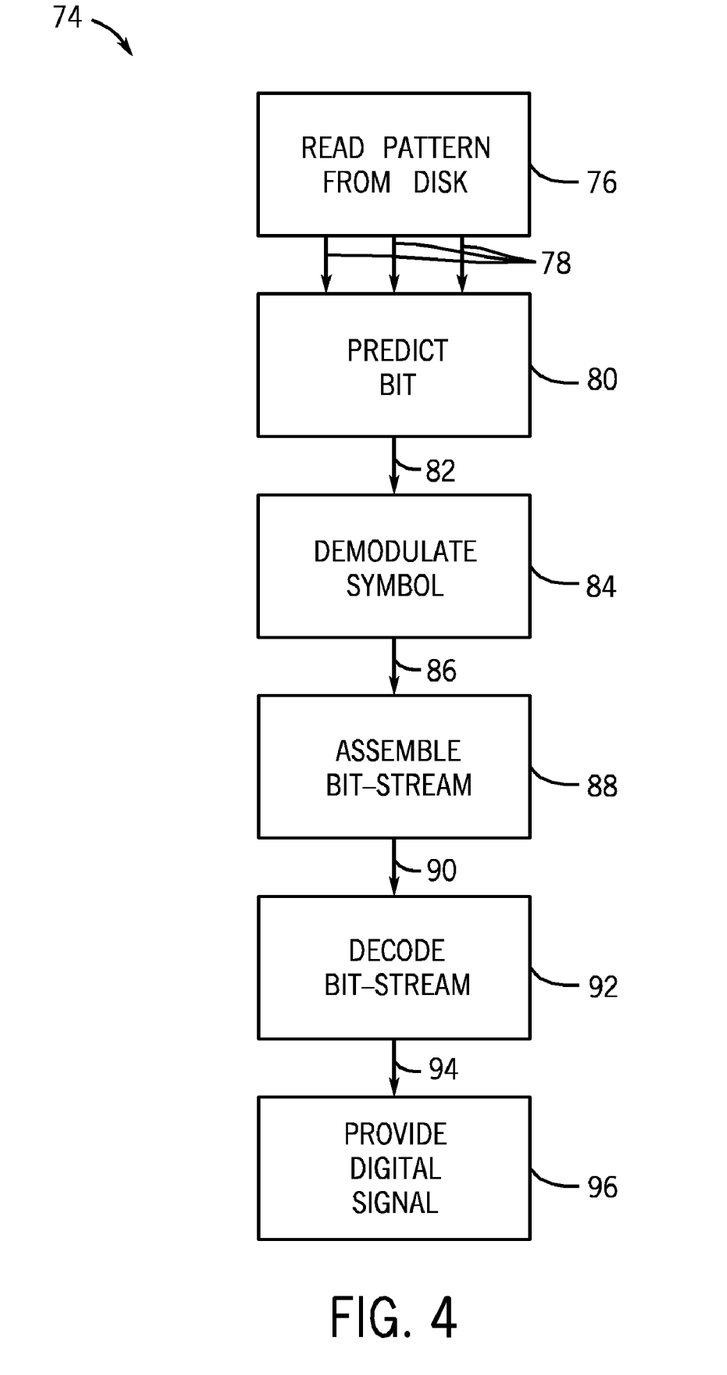
FIG. 4 is a flow chart illustrating a method for reading data from and optical disk, in accordance with embodiments.

A general procedure 74 that may be used to read an optical data disk 12 is shown in the flow chart of FIG. 4. The procedure begins with reading a pattern from an optical data disk 12 using a segmented detector, as indicated in block 76. This may be performed, for example, using the detector discussed with respect to FIG. 7. The quantized values 78 of the intensity within each detector segment may be provided to a bit predictor, which may use the values to predict the value of a bit or bits under the detector (block 80), for example, by the techniques discussed with respect to FIGS. 5 and 6. A sequence of predicted bits 82 may then be provided to a demodulator.

As indicated in block 84, the demodulator identifies symbols in the sequence of predicted bits 82, e.g., sequential patterns of bits, and matches the symbols to corresponding bit sequences 86. The symbols have generally been chosen to decrease read errors caused by interferences, such as surface imperfections on the disks or bit positions in close proximity to the target bit. For example, such symbols may be selected by eight-to-fourteen modulation (EFM), used in modulating CDs, EFM+, used to modulate DVDs, or by the 17PP system, used to modulate Blu-Ray disks. The bit sequences 86 identified by the demodulation are concatenated (block 88), to form a bit-stream 90.

The bit-stream 90 may be decoded to remove any redundant bits associated with an error correction code, as indicated in block 92. Such redundant bits may be associated with any number of error correction codes, including Reed-Solomon encoding, feed-forward systematic codes, recursive systematic codes, Viterbi codes and the like. The redundant bits may then be used to correct at least some of the errors that may have occurred during the reading process, forming a digital signal 94. The digital signal 94 may then be provided to an output device, as indicated in block 96. Such output devices may include those discussed with respect to FIG. 1, the network interface 50, the consumer digital interface 52, or the digital-to-analog signal processor 54, or any combinations thereof.

Figure 5:
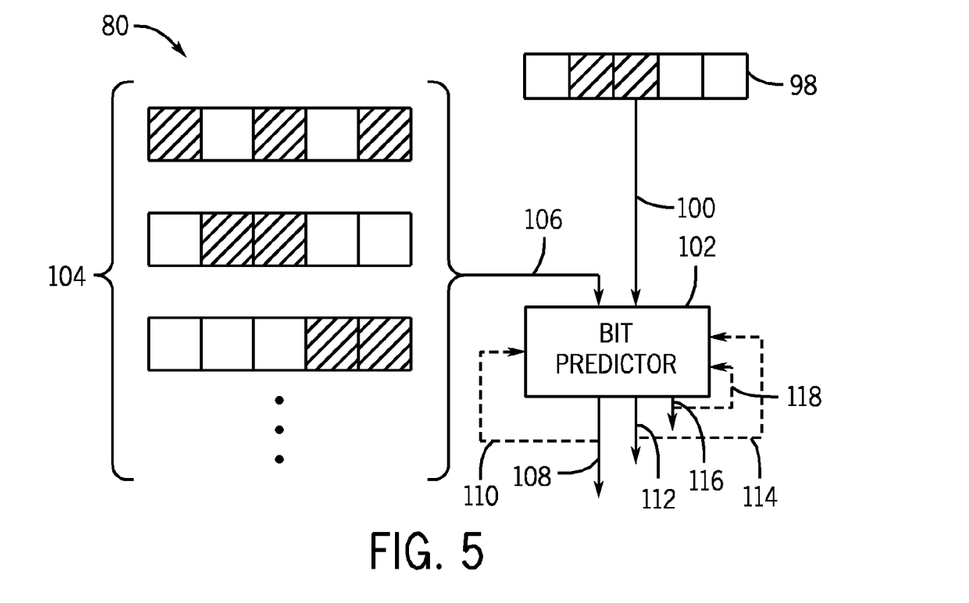
FIG. 5 is a schematic diagram illustrating a bit predictor that compares a multi-pixel detector pattern to previously stored patterns, in accordance with embodiments.

A more detailed view of a process 80 by which a bit value may be predicted from a detected pattern of segments is illustrated in the schematic diagram presented in FIG. 5. In this view, a pattern 98 read from the disk by the segmented detector is provided (as indicated by line 100) to a bit predictor 102. The bit predictor 102 also has access (indicated by line 106) to a series of stored patterns 104. The bit predictor 102 may then compare the currently read pattern 98 to the stored patterns 104 to identify a closest match. As the stored patterns 104 may generally correspond to every possible combination of binary bit sequences that may be detected by the multi-pixel detector, the comparison may result in a probability that a certain bit sequence has been detected. The bit predictor 102 may then provide a predicted value 108 for the bit in the center of the pattern, e.g., the bit under the center detector. Further, the bit predictor 102 may also provide predicted values for the first bit 112 before the center bit 108 and the second bit 116 before the center bit 108.

The comparison between the segment pattern 98 and the stored patterns 104 may be performed by any number of calculation techniques. For example, the bit predictor 102 may perform a straight comparison of the pattern 98 values with the stored patterns 104, such as using the squaring algorithm discussed in the examples below. Alternatively, the bit predictor 102 may use an analog computer that weighs the quantized values for the various segments to determine a match between the pattern 98 and the stored patterns 104. The pattern 98 may also be converted to a digital signal, and the bit predictor 102 may compare the digital signal with digital stored patterns.

Neural networks may also be used to analyze the pattern. In this aspect, the quantized values of the different segments may be used as inputs to an artificial neural network. The weighting of the different segments may be adjusted to enhance the accuracy of the bit prediction. In this application, the stored patterns 104 may not be used, or may be used in parallel to confirm the identification. Techniques such as the use of analog computers or neural networks may accelerate the analysis procedure, which may be useful when reading large amounts of data from optical disks.

The predicted value for the center bit 108 may be fed back to the bit predictor 102 to enhance the accuracy of the prediction of the next bit to be read, as indicated by line 110. This feedback may be used, for example, to weigh particular segments in the pattern 98, or to decrease the time required for searching by indicating a possible identity of the first bit after the center bit. Similarly, the bit prediction for the first bit 112 before the target bit may be fed back to the bit predictor 102, as indicated by line 114, to enhance the prediction of the target bit. For example, when the center detector segment 68 moves a single bit position forward, the bit predictor 102 may already have a prediction of the new center bit 108 that is accurate to 90%, or greater, from a previous reading of the value first bit 112 before the center bit. The predicted status of the second bit 116 ahead of the center bit 108 may also be fed back to the bit predictor 102 in a similar manner, as indicated by line 118.

Figure 6:
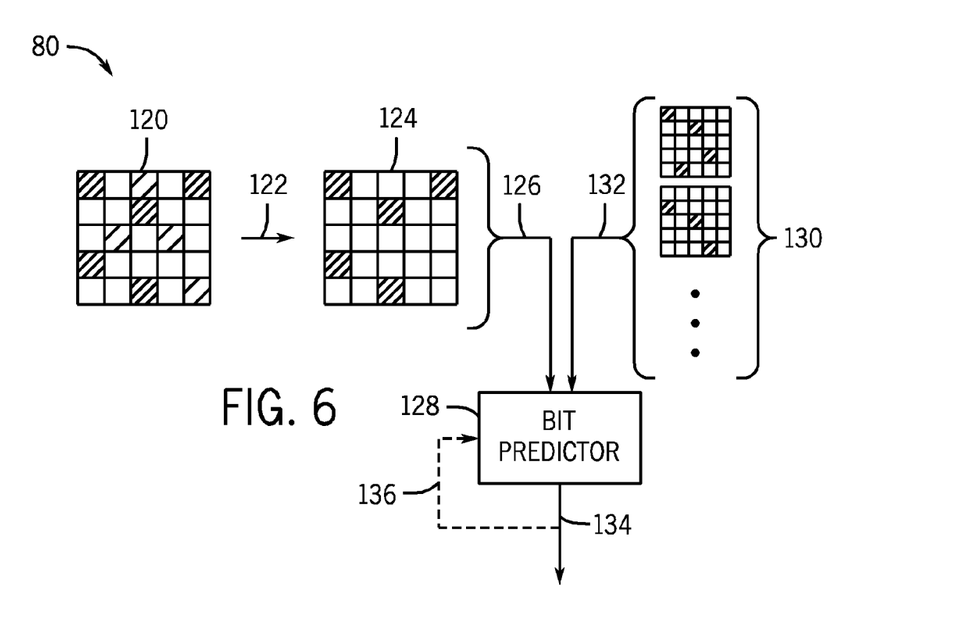
FIG. 6 is a schematic diagram illustrating another bit predictor that compares a multi-pixel detector pattern to previously stored patterns, in accordance with embodiments.

As shown in the schematic diagram of FIG. 6, the bit prediction 80 may be based on a two dimensional pattern 120 from a detector. Generally, each pixel in a multi-pixel detector represents the output of the detector and returns a signal proportional to the incident intensity of a probe light reflected from a data structure. More specifically, when the beam is directed to a position in the data structure, micro-holograms that are present at or near the beam focus may reflect the beam. The intensity detected by a detector is proportional to the squared magnitude of the sum of the electric fields of the micro-hologram reflections under the probe beam. The pixel intensity may be an analog signal which may be converted to a digital signal. For example, binary discretization may be one method of digitally converting the pixel intensities received at a multi-pixel detector. The two dimensional pattern 120 may be directly used to predict the value of a bit or bits of data, or may first be discretized, as indicated by line 122. Binary discretization determines whether each pixel in the two dimensional pattern 120 is greater than a threshold intensity value, as previously discussed, and converts any values greater than the threshold intensity to a binary one. In the same fashion, any value lower than the threshold intensity is converted into a binary zero. For example, the threshold value may be set as low as 20% to detect faint signals, or as high as 90% to decrease interferences from other bits. Other values that may be selected for the threshold include 30%, 40%, 50%, 60%, 70%, 80%, or any values in between. Further, a separate threshold may be used for converting a pixel to a binary zero versus converting a pixel to a binary one. In this aspect, a pixel with an intensity value that is below a first threshold, such as 30%, may be set to a binary zero, while a pixel intensity that is above a second threshold, such as 70%, may be set to a binary one. Intermediate values may be used by the bit predictor without conversion. Discretization is not limited to the two dimensional detector, and may be used with other detector configurations, including the one-dimensional configuration discussed with respect to FIG. 5.

After discretization 122, the resulting two dimensional binary pattern 124 may be provided, as indicated by line 126 to a two dimensional bit predictor 128. A series of previously stored binary patterns 130 may also be provided to the two dimensional bit predictor 128, as indicated by line 132. The bit predictor 128 may compare the two dimensional binary pattern 124 to the stored patterns 130 to identify a corresponding pattern 130. The corresponding pattern 128 may then be used to identify the status of one or more bits under the detector. For example, the bit predictor 128 may identify the value of a center bit 134 under the detector, as well as one or more bits in adjacent tracks. As indicated by line 136, the value of the center bit 134, or other predicted bits, may be fed back to the bit predictor 128 to improve the accuracy of the prediction.

When the data on the optical disk is stored in the form of micro-holograms, the micro-holograms may be recorded with phase changes between proximate micro-holograms. Such phase changes may change the intensity or direction of light reflected from the micro-holograms, and thus change the pattern detected. This change in the detected pattern may be used to further distinguish the bits' states under the detector. For example, the reflections from bits having different phases may be decreased by using the discretized bit pattern 124, which may lower interfering reflections from other tracks or data layers.

Figure 7:
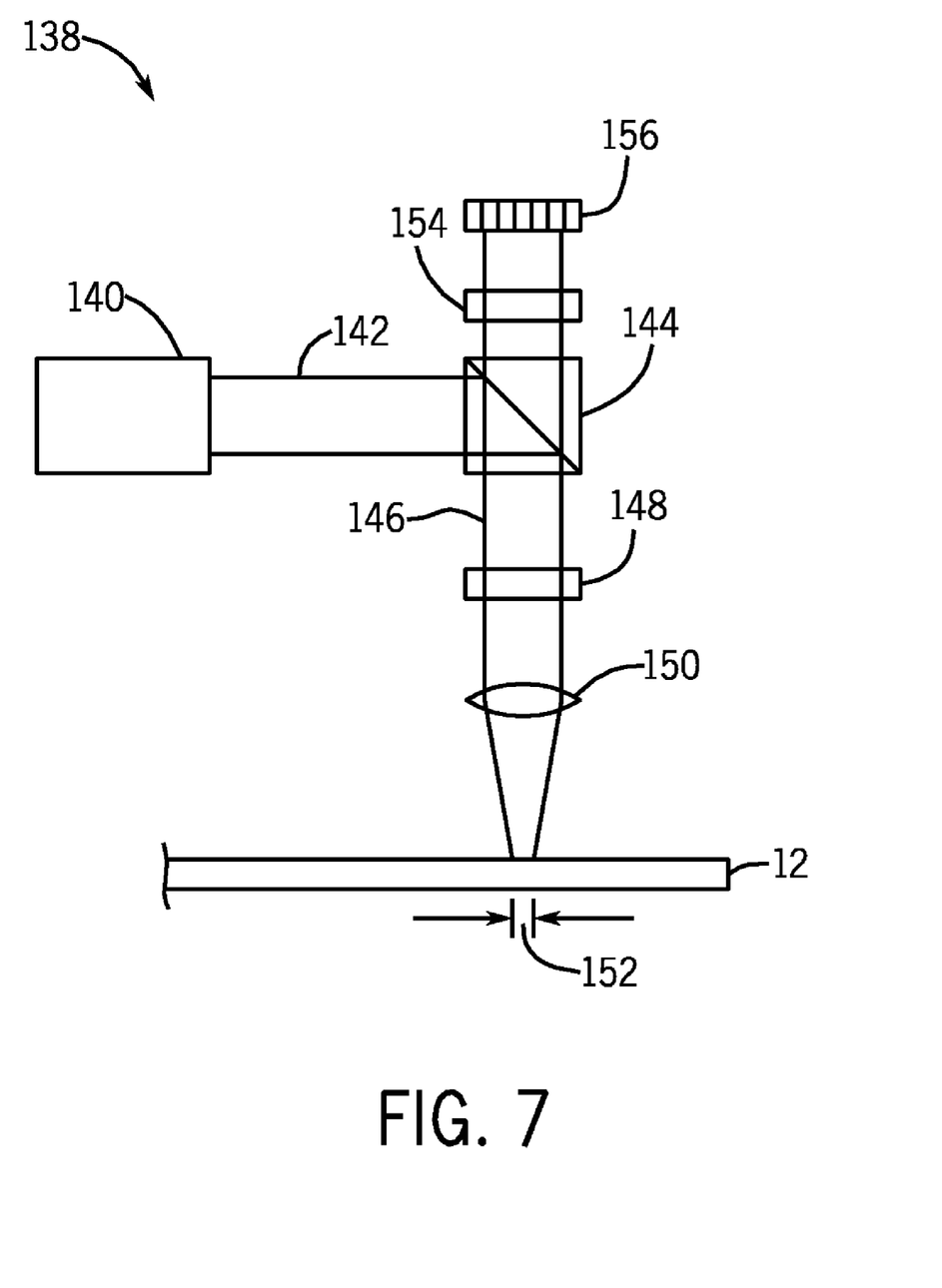
FIG. 7 is schematic diagram illustrating a multi-pixel detector that may be used to detect patterns, in accordance with embodiments.

An example of a multi-pixel detector 138 that may be used to read data from an optical storage disk 12 is illustrated in the schematic diagram shown in FIG. 7. In the detector 138, a light source 140 emits a collimated beam 142. The light source may be a laser diode, and may include optic elements for the collimation. Alternatively, exterior optical elements, such as one or mores lenses, may be used for the collimation. The collimated beam 142 is impinged on a polarizing beam splitter 144 which directs the beam toward the disk as a read beam 146. The read beam 146 passes through a quarter wave plate 148, which rotates the phase of the read beam 146. The read beam 146 is then focused on the disk by a lens 150. The diameter 152 of the focal area of the read beam 146 may cover a single bit position on the optical storage disk 12, or the diameter 152 may cover several adjacent bit positions, including adjacent tracks. The larger diameter 152 for the focal area may be useful if parallel reading of multiple bits is desired, such as by the two dimensional detector system discussed with respect to FIG. 6. A smaller diameter 152 for the focal area may be useful if the only purpose of the multi-pixel detector is to improve reading accuracy of a single bit, such as by the one dimensional array discussed with respect to FIG. 5.

Reflected light from the optical storage disk 12 is collimated by the lens 150, and passes through the quarter wave plate 148. After two passes through the quarter wave plate 148, the polarization of the light is rotated by 90°, and passes through the polarizing beam splitter 144 without being reflected toward the emitter 140. The reflected light may be passed through any number of processing units 154 prior to impinging on the segmented detector 156. Such processing units 154 may include an electro-optical modulator, which may adjust the phase of the reflected light, and thus lower the intensity of the light reflected from micro-holograms in non-targeted layers that have imposed phase delays. Other processing units 154 may be used instead of, or in addition to, an electro-optical modulator. For example, the reflected light may be focused by a lens through a pinhole filter, which may be used to decrease the amount of light returned from off-axis reflections. After passing through the pinhole filter, the light may be impinged on a second lens, which may collimate the light prior to the light impinging on the segmented detector 156.

The segmented detector 156 may be a one dimensional array of segments, oriented along a data track, as discussed with respect to FIGS. 3 and 5 above. Alternatively, the segmented detector 156 may be a two dimensional array as discussed with respect to FIG. 6. In other contemplated embodiments, the segmented detector 156 may be a one dimensional array oriented perpendicular to the data tracks. This configuration may be considered if parallel detection is a higher priority than decreasing read errors. Any geometric tessellation, or mapping, of the segments may be used for the segmented detector. Different configurations may require appropriate modifications of the bit predictors discussed herein, such as generation of expected patterns for the segmented detector.

Example Calculation of Errors

Sample calculations were run to simulate the benefits that may be obtained by using multi-pixel detectors in the bit prediction schemes discussed herein. A typical system without multi-pixel detection was used as a control. The simulation trial for the control system was run using a single pixel (e.g., representing a typical photodetector used in conventional systems) detector and a separation between adjacent data of 1.5 times the width of a focused read beam. No read errors were detected in 10,000 bit reads. In contrast, when the separation between data was decreased to 1 times the width of a focused read beam, 302 errors occurred in 10,000 bit reads, providing about a 3% error rate.

A multi-pixel detector aligned with the data track was then simulated using a comparison to previously stored patterns to identify the status of the data bits, as discussed with respect to FIG. 5. In one embodiment, the multi-pixel detector may have multiple segments, with each segment configured to detect an array of pixels arranged in some geometric tessellation optimized for bit detection (e.g., a rectangular array). As discussed, one method for identifying the state of data bits is to compare the pattern of scattered light from the data bits with stored patterns or templates. An example of this technique may be represented in eqn. 1.

$$\Sigma_{pixels} w_i (ED_i - ES_i)^2 \qquad \text{eqn. 1}$$

In eqn. 1, $ED_i$ represents a detected intensity in a detector pixel, $ES_i$ represents a corresponding intensity in a pixel of a stored pattern, and $w_i$ represents a weighting factor (one in this simulation). Using this algorithm with the simulation trial of the multi-pixel detector, no read errors were detected in 50,000 bit reads. Further, the first future (leading) bit had 3% read errors (1,356 errors in 50,000 bit reads), and the second future bit had 6% read errors (2,989 errors in 50,000 bit reads).

Further simulations were run to determine the effect of changing the number of pixels in the multi-pixel detector to estimate the state of five data bits. In this simulation, noise was added to a 50,000 bit trial to generate a particular read signal-to-noise ratio. The results for the simulation may be seen in the chart 158 shown in FIG. 8. In chart 158, the x-axis 160 represents the signal-to-noise ratio imposed per original simulated fine-grained pixel. The performance calculations used the electric field simulated at the fine-grained pixels to estimate the effect of a detector with 4, 16, 64, 256, and 1024 pixels in the multi-pixel detector. For example, more imposed noise resulted in lower signal-to-noise ratio, to the left of the chart 158, and less imposed noise resulted in higher signal-to-noise ratio, to the right of the chart 158. The y-axis 162 represents the fraction of bit errors occurring during the reading process. Five different sizes of pixel arrays were used for the segment detector: a 4 pixel array, a 16 pixel array, a 64 pixel array, a 256 pixel array, and a 1024 pixel array.

Figure 8:
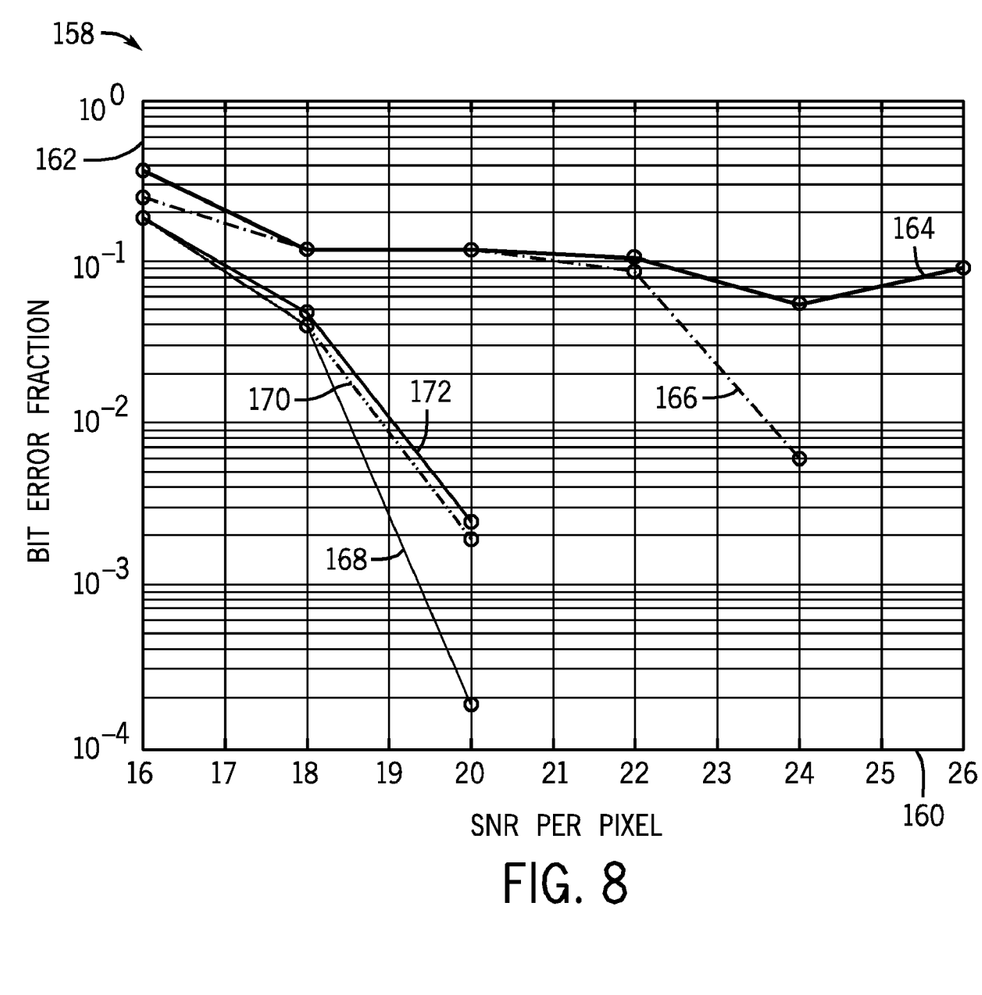
FIG. 8 is a chart illustrating a simulated comparison of bit read errors versus signal-to-noise ratio for detectors having 4, 16, 64, 256, or 1024 pixels, in accordance with embodiments.

The highest error rate, indicated by line 164, corresponded to the 4 pixel array detector. The 16 pixel array detector provided some improvement, as indicated by line 166. The lowest error rate was obtained using a 64 pixel array detector, as indicated by line 168. As the number of pixels increased to 256, the error rate increased, as indicated by line 170. The error rate for a 1024 pixel array detector was slightly higher than for the 256 pixel array detector, as indicated by line 172, but the difference was not substantial. The increase in error rate from the detector of the 256 pixel array and the 1024 pixel array may be explained by limitations of the signal power, or it may be a statistical artifact due to the small number of trials in the simulation run. The results indicate that though there may be a need to find a balance between complexity and performance, increasing the number of pixels in the detector may improve the estimation of the state of multiple bits.

Another simulation was run to test the response of the multi-pixel detector to random phase noise. The simulation was run by imposing a random phase shift on data bits read during a 10,000 bit trial. The results of the simulation are shown in the chart 174 presented in FIG. 9. In the chart 174, the x-axis 176 represents the maximum random phase angle imposed on a target bit or bits to be read, while the y-axis 178 represents the fraction of bit errors occurring during the reading process. A signal-to-additive-noise ratio of 24 dB was also imposed on the bits during the reading process. Three different pixel array sizes were used for the segmented detector: a 4 pixel array detector, a 16 pixel array detector, and a 64 pixel array detector.

Figure 9:
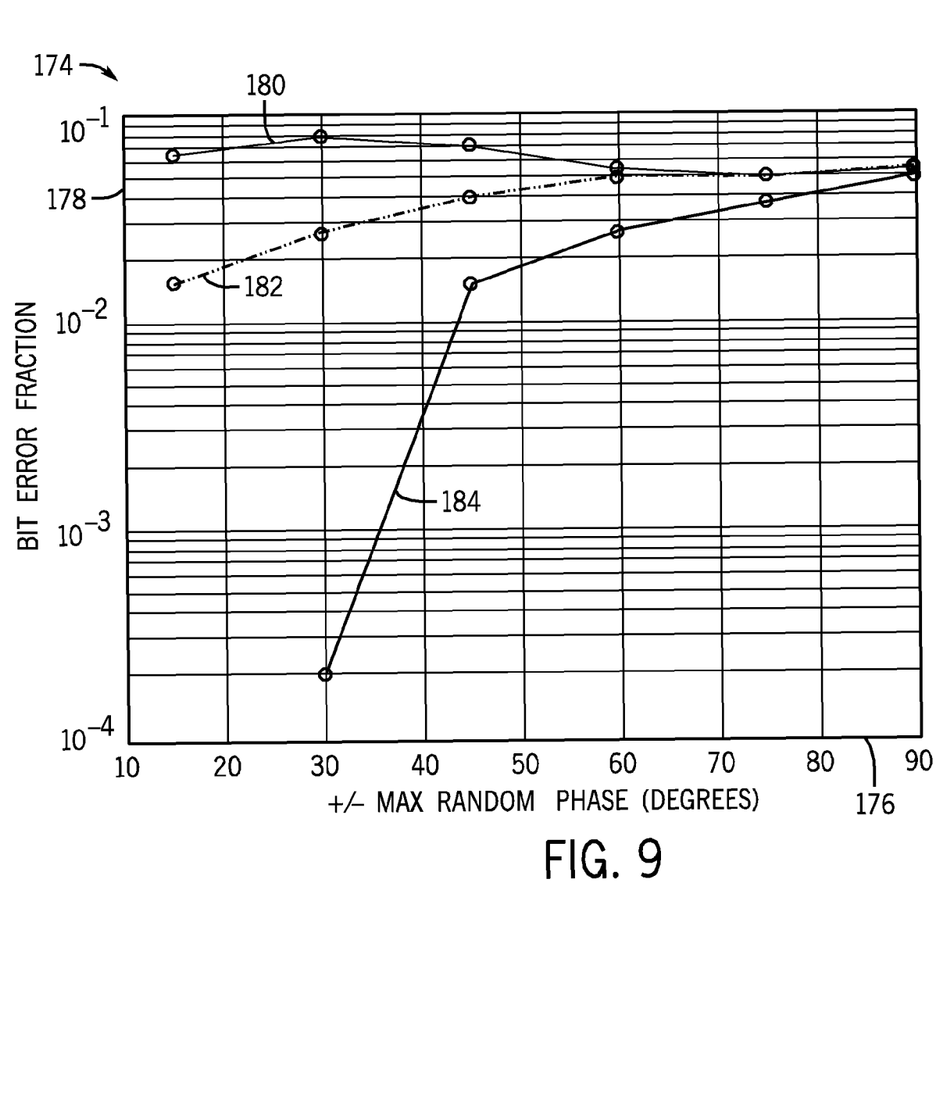
FIG. 9 is a chart illustrating a simulated comparison of bit read errors versus superimposed phase errors for detectors having 4, 16, or 64 pixels, in accordance with embodiments.

The highest error rate, as indicated by line 180, was again obtained using a 4 pixel array detector. A 16 pixel array detector resulted in a lower error rate, as indicated by line 182. The lowest error rate was obtained using a 64 pixel array detector, as indicated by line 184. In all cases, as the maximum phase angle increased, the accuracy of the reading process decreased.

Thus, the pixel size of a multi-pixel detector may affect the accuracy of estimating the presence or absence of a bit. The sampling method of a multi-pixel detector may also affect the accuracy of the bit state estimation. In one embodiment, a multi-pixel detector may be configured for spatial oversampling. As used herein, sampling may refer to the sensing of the presence or absence of a bit or bits of data in microhologram candidate positions, and spatial oversampling may refer to the sampling of a microhologram candidate position more than one time to increase accuracy in estimating the presence or absence of a bit or microhologram. In some embodiments of the present technique, microholograms may be oversampled in a direction parallel to the travel path of the multi-pixel detector, in a direction perpendicular to the travel path of the multi-pixel detector, or in a combination of directions parallel or perpendicular to the travel path of the multi-pixel detector (e.g., oversampling in the x-direction, the y-direction, or some combination of the x and y-directions).

Figure 10A:
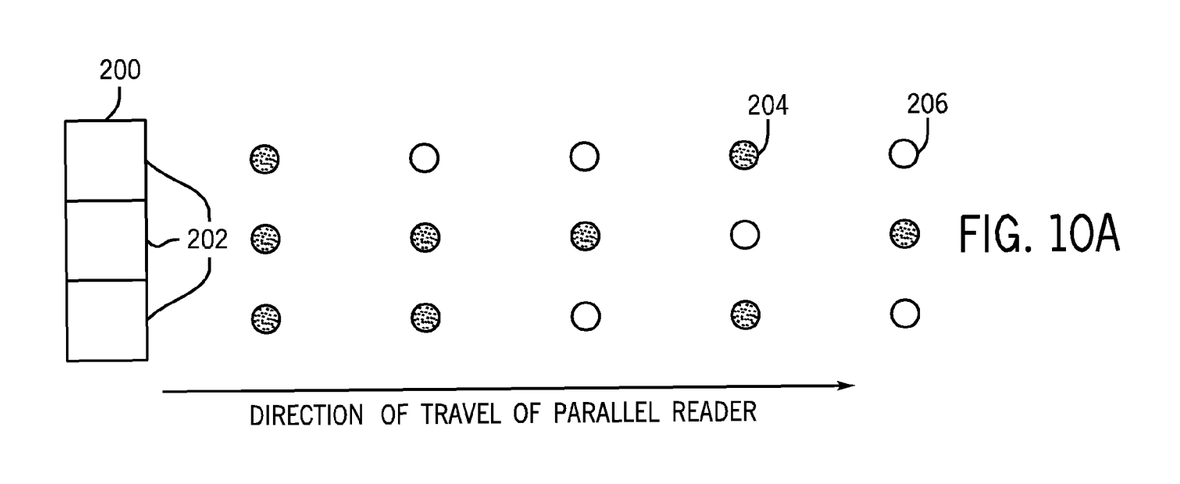
FIGS. 10A-D are depictions of a multi-pixel detector sampling and oversampling bit positions, in accordance with embodiments.
Figure 10B:
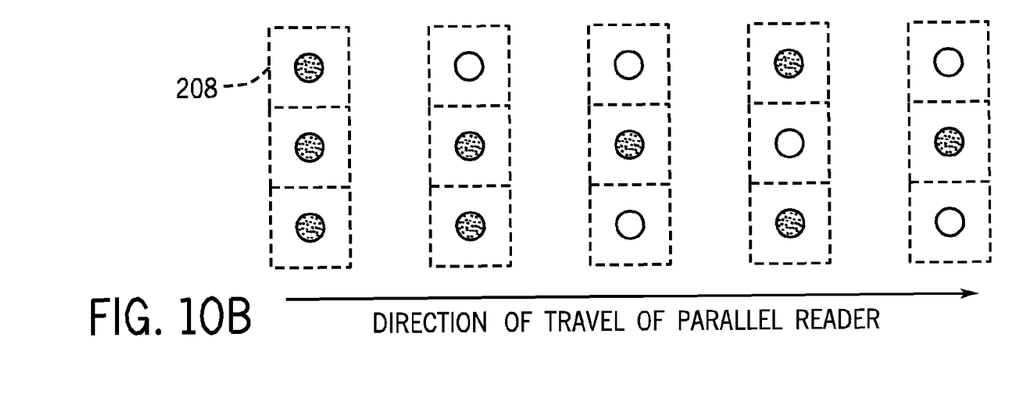

An example of an embodiment of the present technique incorporating spatial oversampling is depicted in FIGS. 10A-D. In FIG. 10A, a multi-pixel detector 200 has three detector segments 202 and may travel in the direction indicated by the arrow. As previously discussed, the number of pixels in the multi-pixel detector 200 does not have to match the number of detector segments 202. Each detector segment 202 may have multiple pixels or an array of pixels. The multi-pixel detector 200 may travel over microhologram candidate positions three at a time. A darkened circle 204 indicates that a microhologram is present, and an undarkened circle 206 indicates that a microhologram is absent. In a typical sampling process, a detector may sample a microhologram candidate position only once, as illustrated in FIG. 10B. The single sampling 208 is illustrated by the dotted outline around each microhologram candidate.

Figure 10C:
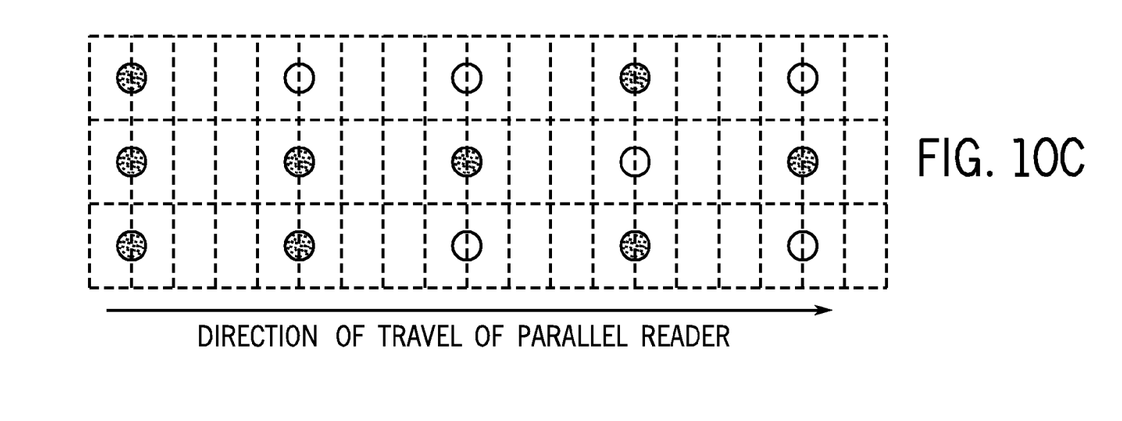
Figure 10D:
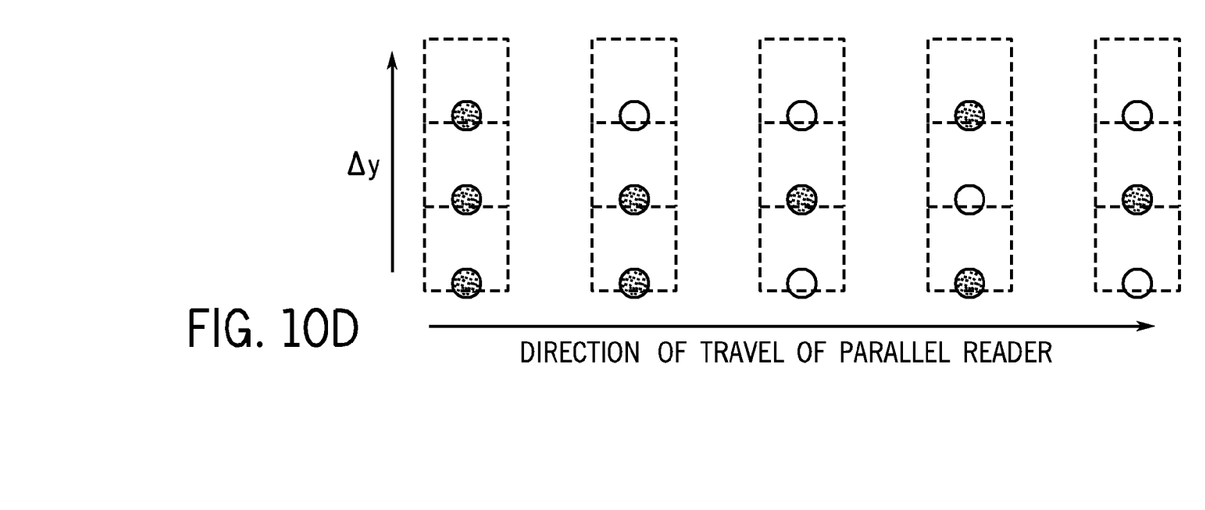

Spatial oversampling is depicted in FIG. 10C, where each microhologram candidate position is sampled more than once. For example, each position may be sampled four times, as illustrated by the four dotted outlines over each position. The sampling locations may be determined by the distance between microhologram candidate center positions. For example, as FIG. 10C depicts sampling four times, the sampling locations in an oversampling process may be approximately ¼ the distance between microhologram candidate center positions. In other embodiments, oversampling may not always occur in regular intervals.

The location of sampling or oversampling may also be offset in a direction perpendicular to the direction of the multi-pixel detector travel path. For example, in FIG. 10D, the detector may be traveling in the x-direction, and the detector centers may be offset in the y-direction to sample each microhologram candidate position. Furthermore, the multi-pixel detector may also oversample in the y-direction, or sample each position more than once in a direction perpendicular to the travel path of the detector.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of reading data from a holographic optical data disk, comprising:
    emitting a first read beam toward a holographic optical data disk, wherein the first read beam is configured to substantially simultaneously illuminate a plurality of micro-reflectors on the holographic optical data disk;
    detecting a first sample comprising light from the first read beam reflected from the plurality of micro-reflectors by a multi-pixel detector;
    emitting a second read beam towards the holographic optical data disk, wherein the second read beam is configured to substantially simultaneously illuminate a plurality of micro-reflectors on the holographic optical data disk;
    detecting a second sample comprising light from the second read beam reflected from the plurality of micro-reflectors by the multi-pixel detector; and
    analyzing the first sample and the second sample to predict a state of a bit.

2. The method of claim 1, comprising:
    demodulating a sequence of symbols from the holographic optical data disk to generate a bit stream;
    decoding the bit stream to remove redundant bits and correct read errors and form a digital signal; and
    providing the digital signal to an output device.

3. The method of claim 1, wherein analyzing the first sample and the second sample comprises: comparing the first sample and the second sample detected by the multi-pixel detector to a series of stored patterns; identifying a stored pattern corresponding to the first sample and the second sample; and predicting the state of the bit based at least in part upon the stored pattern.

4. The method of claim 1, wherein analyzing the first sample and the second sample comprises predicting the state of the bit with an analog computer.

5. The method of claim 1, wherein analyzing the first sample and the second sample comprises predicting the state with a neural network.

6. A detector for reading holographic optical disks, comprising:
    an emitter configured to emit a collimated beam;
    optic elements configured to focus the collimated beam onto an area of a data disk comprising a plurality of micro-reflectors representing bit positions and collect light reflected from the area of the data disk;
    a multi-pixel detector configured to detect a first sample comprising light reflected from the area and detect a second sample comprising light reflected from the area; and
    a bit predictor configured to analyze the first sample and the second sample and predict a state of a bit on the data based on the first sample and the second sample.

7. The detector of claim 6, wherein the emitter comprises a laser diode and a collimation lens.

8. The detector of claim 6, comprising an electro-optical modulator configured to adjust a phase delay of the collimated beam.

9. The detector of claim 6, wherein the multi-pixel detector comprises a one-dimensional array disposed in a parallel fashion to a track on the data disk.

10. The detector of claim 6, wherein the multi-pixel detector comprises a one-dimensional array disposed in a perpendicular fashion across multiple tracks on the data disk.

11. The detector of claim 6, wherein the multi-pixel detector comprises a two-dimensional array configured to identify patterns across multiple tracks of the data disk.

12. The detector of claim 11, wherein a size of a pixel in a center of the array is smaller than a size of a pixel at an outer edge of the two-dimensional array.

13. The detector of claim 6, wherein the multi-pixel detector comprises a charge coupled device.

14. The detector of claim 6, wherein the bit predictor comprises an analog computer.

15. The detector of claim 6, wherein the bit predictor comprises a neural network.

16. A system for reading a holographic data disk, comprising:
- a multi-pixel detector configured to oversample an area from a holographic optical disk to produce a plurality of samples each comprising reflections from micro-reflectors representing data bit positions in the area;
- a bit predictor configured to analyze each of the plurality of samples and predict a value for a bit from the reflections from the micro-reflectors representing data bit positions to form a sequence of bits; and
- a processor configured to analyze the sequence of bits and generate a digital data signal.

* * * * *